(12) United States Patent
Shimmo et al.

(10) Patent No.: US 6,839,173 B2
(45) Date of Patent: Jan. 4, 2005

(54) REFLECTION TYPE DIFFRACTION GRATING

(75) Inventors: Katsuhide Shimmo, Osaka (JP); Shinji Kawamoto, Osaka (JP); Terufusa Kunisada, Osaka (JP); Kenichi Nakama, Osaka (JP)

(73) Assignee: Nippon Sheet Glass, Co., Ltd., Osaka (JP)

( * ) Notice: Subject to any disclaimer, the term of this patent is extended or adjusted under 35 U.S.C. 154(b) by 0 days.

(21) Appl. No.: 09/953,219

(22) Filed: Sep. 17, 2001

(65) Prior Publication Data

US 2002/0044359 A1 Apr. 18, 2002

(30) Foreign Application Priority Data

Sep. 21, 2000 (JP) .................................... P2000-286546

(51) Int. Cl.⁷ ................................................. G02B 5/18
(52) U.S. Cl. ....................... 359/572; 359/569; 359/571; 359/576
(58) Field of Search .......................... 427/166; 359/572, 359/569, 566, 571, 576

(56) References Cited

U.S. PATENT DOCUMENTS

| | | | | |
|---|---|---|---|---|
| 4,330,175 A | | 5/1982 | Fujii et al. | |
| 4,765,705 A | | 8/1988 | Seymour et al. | |
| 4,846,552 A | * | 7/1989 | Veldkamp et al. | 359/572 |
| 5,007,709 A | * | 4/1991 | Iida et al. | 359/574 |
| 5,377,044 A | * | 12/1994 | Tomono et al. | 359/566 |
| 6,162,495 A | * | 12/2000 | Morton | 427/166 |
| 6,218,194 B1 | * | 4/2001 | Lyndin et al. | 436/518 |
| 6,285,497 B1 | * | 9/2001 | Sweatt et al. | 359/351 |
| 2002/0141065 A1 | * | 10/2002 | Cowan et al. | 359/599 |

FOREIGN PATENT DOCUMENTS

CN 382069 2/2000

WO WO 99/16555 4/1999

OTHER PUBLICATIONS

European Search Report dated Jun. 2, 2003.
XP0022422934 "Handbook of Optical Constants of Solids I" dated 1998 p. 285 pps.294–295, 356–357, 390–406.
XP0022422935 "Handbook of Optical Constants of Solids I" dated 1991 pps. 912–915.
XP00425848 article titled "Fabrication and evaluation of etched infrared diffraction grating" dated 1994 vol. 33, No. 1 U.U. Graf, D.T. Jaffe, E.J. Kim, J.H. Lacy, H. Ling. J.T. Moore and G. Rebeiz.
XP002243005 A Handbook "Properties of Optical and Laser–Related Materials" dated 1997 pp. 392–393.
XP002914565 Article titled "Reflecting Coatings for the Extreme Ultraviolet" dated Jun. 1959 vol. 19, No. 6 pp. 593–604.
O plus E vol. 21, No. 5, pp. 511–519, 1999.
Optronics, 1996, No. 8, pp. 112–116.

* cited by examiner

Primary Examiner—Fayez Assaf
(74) Attorney, Agent, or Firm—Whitham Curtis & Christofferson, P.C.

(57) ABSTRACT

A reflection type diffraction grating according to the present invention has a structure in which a metal film as a first layer with reflectance not lower than 30% with respect to the wavelength of incident light and a transparent dielectric film as a second layer are laminated successively on the surface of the reflection type diffraction grating. With respect to the wavelength of incident light, the metal film has a refractive index selected to be not higher than 1.5 and an extinction coefficient selected to be not smaller than 6.0. The transparent dielectric film has a refractive index selected to be in a range of from 1.30 to 1.46, both inclusively, with respect to the wavelength of incident light and has an optical film thickness selected to be in a range of from $0.20\lambda$ to $0.38\lambda$, both inclusively, when $\lambda$ is the wavelength of incident light.

6 Claims, 1 Drawing Sheet

REFLECTION TYPE DIFFRACTION GRATING

BACKGROUND OF THE INVENTION

The present invention relates to a spectroscopic optical device, especially to a reflection type diffraction optical device used widely in an optical technology field such as an optical sensor, an information recording device, an optical measuring device, and so on.

Diffraction gratings are used popularly as spectroscopic optical devices or optical demultiplexing devices. Among these diffraction gratings, a reflection type diffraction grating using diffracted light as reflected light is, in most cases, configured in such a manner that a metal film is formed as a reflection film on a surface of a member having grooves formed periodically so as to improve reflection efficiency of the reflection type diffraction grating. A high-reflectance material such as Al, Au, or the like, is used as the metal film provided on the surface of the periodically grooved member.

If such reflection metal films are used in a state of being exposed to an environment, weather resistance and abrasion resistance of these reflection metal films may be insufficient. Particularly it is known that an Al film is inferior in oxidation resistance. An Au film is insufficient in mechanical strength. In order to improve durability of such a reflection metal film, generally, the planar metal film is coated with a transparent dielectric film or the like. It is known that oxidation resistance particularly in the case of a reflection Al film is improved when a magnesium fluoride ($MgF_2$) film is used as a protective film of the reflection Al film. It is also known that the $MgF_2$ film has an effect in improving reflectance in a near-ultraviolet region.

It is however known that a reflection type diffraction grating having a groove period in a range of from 0.1 to 10 times as large as the wavelength of incident light has its diffracted light intensity varying in dependence on polarization of incident light (for example, see O plus E, Vol.21, No.5, p.511 (1999)). A polarization separating device positively using this characteristic for separating polarized light has been proposed (for example, see Optronics, No.8, p.112 (1996)).

On the other hand, when such a diffraction optical device is used as a demultiplexing device in the field of optical communication or the like, it is necessary to keep the intensity of diffracted light constant regardless of the state of polarization of incident light. For example, in wavelength-multiplex communication, light with a large number of wavelengths which is transferred by one optical fiber needs to be spectrally distributed by a diffraction grating in order to read information of individual wavelengths. On this occasion, the state of polarization of light emitted through the optical fiber is not controlled. Hence, when the light is made incident on the diffraction grating directly, the intensity of diffracted light depends on the state of polarization. There arises a problem that information processing of such light is made complex.

Also when a reflection type diffraction optical device is applied to the case where light from a laser light source is condensed and irradiates a fine roughness structure of the diffraction optical device to read out the shape of the fine roughness structure, sensitivity of the reflection type diffraction optical device is lowered in accordance with the state of polarization of the laser light source so that signal analysis is made complex.

To control the polarization of light incident on such a diffraction optical device, a method of inserting a polarizer, a filter or the like in an optical system has been proposed. In the proposed method, however, insertion loss is produced because of the inserted device as well as the optical system is made complex because of increase in the number of devices. There is a problem that the intensity of light is lowered.

SUMMARY OF THE INVENTION

The present invention is devised to solve the aforementioned problems and an object of the invention is to provide a reflection type diffraction grating in which the intensity of reflected light can be obtained without lowering of reflectance and regardless of the state of polarization of incident light.

According to the present invention, there is a reflection type diffraction grating having a groove period which is 0.1 to 10 times as large as a wavelength of incident light, a laminate of a metal film as a first layer with reflectance not lower than 30% and a transparent dielectric film as a second layer, the first and second layers being laminated in order on a surface side of the groove period.

Preferably, the metal film has a refractive index not higher than 2.0 and an extinction coefficient not smaller than 6.0 with respect to the wavelength of the incident light; and the dielectric film has a refractive index in a range of from 1.30 to 1.65, both inclusively, with respect to the wavelength of the incident light and has an optical film thickness 0.20 to 0.80 times, both inclusively, as large as the wavelength of the incident light.

Further preferably, the dielectric film has a refractive index in a range of from 1.30 to 1.46, both inclusively, with respect to the wavelength of the incident light and has an optical film thickness 0.20 to 0.38 times, both inclusively, as large as the wavelength of the incident light.

The above-mentioned characteristics may be realized when the metal film is constituted by any one selected from Al or an alloy containing Al as a main component, Ag or an alloy containing Ag as a main component, Cu or an alloy containing Cu as a main component, and Au or an alloy containing Au as a main component.

DESCRIPTION OF THE PREFERRED EMBODIMENT

Figure 1:
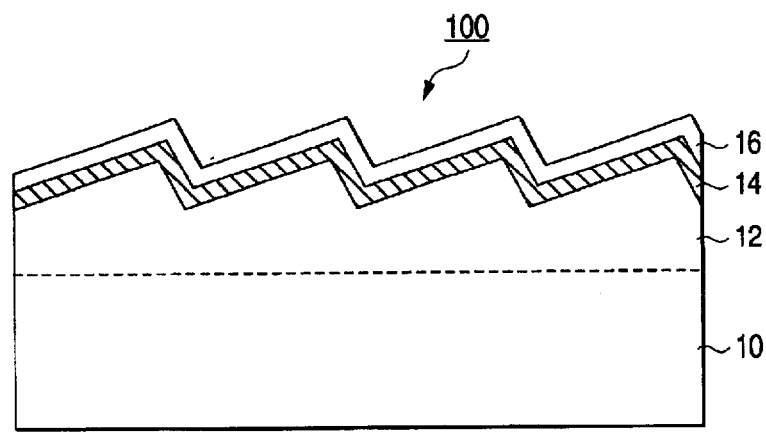
FIG. 1 is a sectional view showing the structure of a reflection type diffraction grating according to the present invention.

The present invention will be described below on the basis of an embodiment thereof. First, simulation was performed by use of a method called matrix method in order to find out a film configuration for achieving the object of the present invention. This method has been described in detail in the reading "Optical Thin Film" (The Nikkan Kogyo Shinbun Ltd.) written by H. A. Macleod.

From this simulation, the inventors of this application have found that a laminate structure in which a metal film and a transparent dielectric film are provided on a flat substrate makes it possible to achieve an optical reflecting mirror free from polarization even in the case where light is made incident obliquely.

From results of this simulation; it has been concluded that a material with an extinction coefficient (imaginary part of a complex index of refraction) k which is not smaller than 6.0 is preferably used as the metal film in order to make reflectance high. Incidentally, in a general metal, k is equal to or smaller than about 20. From another point of view, a material with a refractive index (real part of the complex index of retraction) n which is not higher than 2.0 is preferably used as the metal film. In a general metal, n is equal to or larger than about 0.2. Examples of the metal material satisfying such characteristics are Al, Ag, Au, and Cu. Any one of these metal materials may be used as a single-element metal or an alloy containing any one of these metal materials as a main component may be used.

It has been also found that the transparent dielectric film needs to have a refractive index in a range of from 1.30 to 1.65, both inclusively, with respect to the wavelength of incident light and needs to have an optical film thickness in a range of from $0.20\lambda$ to $0.80\lambda$, both inclusively, when $\lambda$ is the wavelength of incident light. Further, it is preferable that the transparent dielectric film has a refractive index in a range of from 1.30 to 1.46, both inclusively, with respect to the wavelength of incident light and has an optical film thickness of from $0.20\mu$ to $0.38\lambda$, both inclusively. Examples of the material for the transparent dielectric film satisfying such characteristic may include: magnesium fluoride, silicon dioxide, titanium dioxide and aluminum oxide which will be described in Examples; and calcium fluoride, aluminum fluoride, yttrium fluoride, ytterbium fluoride, silicon monoxide, and so on. Especially, a fluorine compound such as magnesium fluoride, calcium fluoride or the like is preferably used because the compound does not oxidize a surface of the metal film when a film of the compound is formed on the metal film.

The material for a diffraction grating substrate is not particularly limited. Also the method of forming a surface fine-roughness groove structure serving as a diffraction grating is not particularly limited.

The method of forming the metal film and the transparent dielectric film in the present invention is not particularly limited. For example, each of the films may be formed by use of a suitable method such as a vacuum evaporation film-forming method, a sputtering film-forming method, a sol-gel film-forming method, a chemical vapor-phase deposition method (CVD), a vacuum evaporation film-forming method using plasma called ion plating, or the like.

Incidentally, when adhesion between an Au film used as the metal film and the substrate is insufficient, for example, a Cr film or the like may be used as an intermediate layer between the substrate and the metal film in accordance with the necessity. That is, the metal film need not be limited to a single-layer film.

EXAMPLE 1

A fine roughness structure of a diffraction grating according to the present invention was produced by the following method. First, a sol solution containing a liquid hydrolysate of methyltriethoxysilane as a main component was applied onto a glass substrate 10 shown in FIG. 1 by spin coating, This sol-solution-applied substrate 10 was press-molded while a brazed replica diffraction grating (900/mm) which was subjected to mold release treatment and which was available on the market was used as a stamping mold. Then, mold release treatment and baking were performed to thereby obtain a fine roughness structure 12 serving as a diffraction grating. The depth of each of the roughness grooves was about 1 $\mu$m. Al was vacuum-deposited on a surface of the fine roughness structure to thereby form a metal film 14 with a thickness of 100 nm. The reflectance of the Al film was not lower than 90% with respect to non-polarized light. Silicon dioxide ($SiO_2$) and titanium dioxide ($TiO_2$) were vacuum-deposited successively on the Al film to thereby form a dielectric film 16 constituted by two layers 280 nm and 170 nm thick. Thus, a reflection type diffraction grating 100 according to the present invention was obtained.

Figure 2:
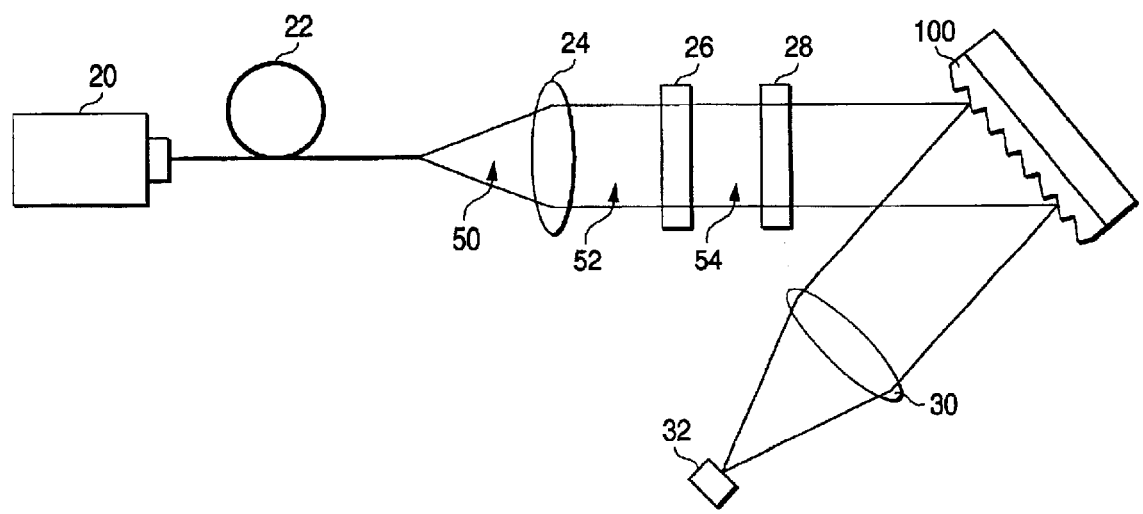
FIG. 2 is a view showing an optical system for evaluating polarization dependence of diffraction efficiency.

The diffraction efficiency of the diffraction grating was evaluated, by use of an optical system shown in FIG. 2, as follows. Light 50 emitted from a laser light source 20 of a 1550 nm-wavelength region through an optical fiber 22 was collimated by a collimator lens 24. The collimated light 52 was made to pass through a quarter-wave plate 26 to thereby generate linearly polarized light 54. Then, the light 54 was made to pass through a half-wave plate 28 the rotational angle of which has been adjusted to thereby control the state of polarization of the light. Thus, the diffraction grating 100 was irradiated with the light. Primary diffracted light in each of TE-polarized light and TM-polarized light obtained thus was condensed by a lens 30 so as to be incident on a light-receiving device 32. The quantity of the diffracted light was estimated on the basis of a generated current and compared with the quantity of reflected light in the case of an Al single-layer film to thereby calculate diffraction efficiency of the diffraction grating 100 with respect to each of the TE-polarized light and the TM-polarized light.

As a result, the diffraction efficiency of the diffraction grating having an Al single layer was 25.9% with respect to the TE-polarized light and 77.1% with respect to the TM-polarized light whereas the diffraction efficiency of the diffraction grating having the dielectric film formed on the Al layer was 45.1% with respect to the TE-polarized light and 74.5% with respect to the TM-polarized light. The later diffraction grating was possible to improve polarization dependence. Further, increase of stray light due to the dielectric film formation was evaluated. No change of stray light was observed.

EXAMPLE 2

Al and magnesium fluoride ($MgF_2$) were deposited on a holographic replica diffraction grating (900/mm, provided with a reflection Al film formed thereon) available on the market to thereby form two layers 100 nm and 250 nm thick respectively. That is, this Example has two metal films (an Al film originally provided on the holographic replica diffraction grating, and another Al deposited on the holographic replica diffraction grating). The diffraction efficiency of the thus produced diffraction grating with respect to the wavelength of 1550 nm was measured in the same manner as that in Example 1. As a result, the diffraction efficiency of the diffraction grating having an Al single layer was 32.8% with respect to the TE-polarized light and 82.5% with respect to the TM-polarized light whereas the diffraction efficiency of the diffraction grating having the dielectric film formed on the Al layer was 41.9% with respect to the TE-polarized light and 54.9% with respect to the TM-polarized light. That is, the later diffraction grating was slightly lowered in reflectance but its polarization dependence was improved more greatly. Further, increase of stray light due to the dielectric film formation was evaluated. No change of stray light was observed.

Comparative Example 1

The diffraction efficiency of a brazed replica diffraction grating (provided with a reflection Al film formed thereon) available on the market was measured with respect to the wavelength of 1550 nm. As a result, the diffraction efficiency was 30.6% with respect to the TE-polarized light and 58.7% with respect to the TM-polarized light. The diffraction grating was low in reflectance and large in polarization dependence.

Comparative Example 2

An Au thin film 100 nm thick was sputtered onto the holographic replica diffraction grating (900/mm, provided with a reflection Al film formed thereon) available on the market. The diffraction efficiency of the thus produced diffraction grating was measured with respect to the wavelength of 1550 nm. As a result, the diffraction efficiency was 28.0% with respect to the TE-polarized light and 65.5% with respect to the TM-polarized light. Further, increase of stray light due to the Au thin film formation was evaluated. As a result, there was no change of stray light observed. However, the diffraction grating was low in reflectance and large in polarization dependence.

EFFECT OF THE INVENTION

According to the present invention, there can be achieved a reflection type diffraction grating which is small in the change of diffraction efficiency with respect to polarized light and high in reflectance. Hence, a filter or the like which is required to be inserted in an optical system to lower polarization dependence in the background art becomes needless, so that spectral sensitivity can be made high as well as the optical system can be made simple.

What is claimed is:

1. In a diffraction grating having a groove period which is 0.1 to 10 times as large as a wavelength of incident light $\lambda$, a reflection type diffraction grating comprising (1) a laminate of a metal film as a first layer with reflectance not lower than 30%; wherein said metal film has a refractive index not higher than 2.0 and an extinction coefficient not smaller than 6.0 with respect to the wavelength of the incident light; and (2) a transparent dielectric film as a second layer, wherein the transparent dielectric film has an optical film thickness in a range of $0.20\lambda$ to $0.80\lambda$, said first and second layers being laminated in order on a surface side of said diffraction grating, whereby incident light is reflected by said first layer through said second layer; wherein said dielectric film has a refractive index in a range of from 1.30 to 1.65, both inclusively, with respect to the wavelength of the incident light.

2. A reflection type diffraction grating according to claim 1, wherein said dielectric film has a refractive index in a range of from 1.30 to 1.46, both inclusively, with respect to the wavelength of the incident light and has an optical film thickness 0.20 to 0.38 times, both inclusively, as large as the wavelength of the incident light.

3. A reflection type diffraction grating according to claim 2, wherein said metal film is constituted by a material selected from the group consisting of Al or an alloy containing Al as a main component, Ag or an alloy containing Ag as a main component, Cu or an alloy containing Cu as a main component, and Au or an alloy containing Au as a main component.

4. A reflection type diffraction grating according to claim 1, wherein said metal film is constituted by a material selected from the group consisting of Al or an alloy containing Al as a main component, Ag or an alloy containing Ag as a main component, Cu or an alloy containing Cu as a main component, and Au or an alloy containing Au as a main component.

5. A reflection type diffraction grating according to claim 1, wherein said metal film is constituted by a material selected from the group consisting of Al or an alloy containing Al as a main component, Ag or an alloy containing Ag as a main component, Cu or an alloy containing Cu as a main component, and Au or an alloy containing Au as a main component.

6. A diffraction grating comprising:

(A) a substrate defining a fine roughness structure on a surface, said fine roughness structure being constructed by a large number of fine grooves arranged periodically;

(B) a transparent dielectric layer provided to said substrate as an exposed surface; wherein the transparent dielectric film has an optical film thickness in a range of $0.20\lambda$ to $0.80\lambda$; and wherein a refractive index of said dielectric layer is in a range of from 1.30 to 1.65, both inclusively, with respect to the wavelength of the incident light;

(C) at least one metal layer provided to said substrate to be located between said dielectric layer and said fine roughness structure; and reflectance of said metal layer is not lower than 30%; and wherein a refractive index of said metal layer is not higher than 2.0 with respect to the wavelength of the incident light; and wherein an extinction coefficient of said metal layer is not smaller than 6.0 with respect to the wavelength of the incident light.

* * * * *